(12) United States Patent
Sinharoy et al.

(10) Patent No.: US 10,884,753 B2
(45) Date of Patent: Jan. 5, 2021

(54) ISSUE QUEUE WITH DYNAMIC SHIFTING BETWEEN PORTS

(71) Applicant: International Business Machines Corporation, Armonk, NY (US)

(72) Inventors: Balaram Sinharoy, Poughkeepsie, NY (US); Joel A. Silberman, Somers, NY (US); Brian W. Thompto, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 252 days.

(21) Appl. No.: 15/826,745

(22) Filed: Nov. 30, 2017

(65) Prior Publication Data

US 2019/0163486 A1    May 30, 2019

(51) Int. Cl.
*G06F 9/38*    (2018.01)
*G06F 9/30*    (2018.01)

(52) U.S. Cl.
CPC ........ *G06F 9/3851* (2013.01); *G06F 9/30014* (2013.01); *G06F 9/30036* (2013.01)

(58) Field of Classification Search
CPC .... G06F 9/3851; G06F 9/3889; G06F 9/3836; G06F 3/0613; G06F 3/0659
USPC .......................................... 710/36, 107, 240
See application file for complete search history.

(56) References Cited

U.S. PATENT DOCUMENTS

| | | | |
|---|---|---|---|
| 5,655,096 A | | 8/1997 | Branigin |
| 5,689,674 A | * | 11/1997 | Griffith ................ G06F 9/3836 |
| | | | 712/214 |
| 5,710,902 A | | 1/1998 | Sheaffer et al. |
| 6,065,105 A | | 5/2000 | Zaidi |

(Continued)

FOREIGN PATENT DOCUMENTS

| | | |
|---|---|---|
| CN | 101034345 A | 9/2007 |
| CN | 102360309 A | 2/2012 |

OTHER PUBLICATIONS

Anonymously; System of Programmable Mode Control within an Instruction Sequencing Unit for Management of Power within a Microprocessor; http://ip.com/IPCOM/000217762D; May 11, 2012, 2 pages.

(Continued)

*Primary Examiner* — Aimee Li
*Assistant Examiner* — Kasim Alli
(74) *Attorney, Agent, or Firm* — Cantor Colburn LLP; Jason Sosa

(57) ABSTRACT

Aspects include monitoring a number of instructions of a first type dispatched to a first shared port of an issue queue of a processor and determining whether the number of instructions of the first type dispatched to the first shared port exceeds a port selection threshold. An instruction of a third type is dispatched to a second shared port of the issue queue associated with a plurality of instructions of a second type based on determining that the number of instructions of the first type dispatched to the first shared port exceeds the port selection threshold. The instruction of the third type is dispatched to the first shared port of the issue queue associated with a plurality of instructions of the first type based on determining that the number of instructions of the first type dispatched to the first shared port does not exceed the port selection threshold.

18 Claims, 7 Drawing Sheets

(56) References Cited

U.S. PATENT DOCUMENTS

| | | | |
|---|---|---|---|
| 6,336,183 B1* | 1/2002 | Le | G06F 9/3834 712/208 |
| 6,425,074 B1 | 6/2002 | Meier et al. | |
| 6,463,523 B1 | 10/2002 | Kessler et al. | |
| 6,553,480 B1 | 4/2003 | Cheong | |
| 6,557,095 B1 | 4/2003 | Henstrom | |
| 6,728,866 B1* | 4/2004 | Kahle | G06F 9/3828 711/173 |
| RE38,599 E | 9/2004 | Tremblay | |
| 6,931,639 B1 | 8/2005 | Eickemeyer | |
| 6,988,183 B1 | 1/2006 | Wong | |
| 6,988,186 B2 | 1/2006 | Eickemeyer et al. | |
| 7,133,925 B2 | 11/2006 | Mukherjee et al. | |
| 7,219,249 B1 | 5/2007 | Ghose | |
| 7,464,253 B2 | 12/2008 | Viedenbaum et al. | |
| 7,472,258 B2 | 12/2008 | Burky | |
| 7,689,812 B2 | 3/2010 | Abernathy et al. | |
| 8,127,116 B2 | 2/2012 | Islam et al. | |
| 8,285,974 B2 | 10/2012 | Singh et al. | |
| 8,392,672 B1 | 3/2013 | Rhoades et al. | |
| 8,521,998 B2 | 8/2013 | Albernathy et al. | |
| 8,667,260 B2 | 3/2014 | Eichenberger et al. | |
| 8,930,432 B2* | 1/2015 | Hickey | G06F 9/3001 708/501 |
| 9,047,079 B2 | 6/2015 | Bruce et al. | |
| 9,058,180 B2 | 6/2015 | Golla et al. | |
| 9,146,774 B2 | 9/2015 | Busaba et al. | |
| 9,158,573 B2 | 10/2015 | Busaba et al. | |
| 9,298,466 B2 | 3/2016 | Buyuktosunoglu et al. | |
| 9,489,207 B2 | 11/2016 | Burky et al. | |
| 9,513,924 B2 | 12/2016 | Gschwind et al. | |
| 9,619,383 B2 | 4/2017 | Busaba et al. | |
| 2002/0053038 A1 | 5/2002 | Buyukosunoglu et al. | |
| 2003/0069920 A1 | 4/2003 | Melvin et al. | |
| 2004/0177239 A1 | 9/2004 | Clift et al. | |
| 2004/0215938 A1 | 10/2004 | Burky | |
| 2005/0038979 A1* | 2/2005 | Fischer | G06F 7/4824 712/214 |
| 2005/0243734 A1 | 11/2005 | Nemirovsky et al. | |
| 2006/0095732 A1 | 5/2006 | Tran | |
| 2009/0100249 A1 | 4/2009 | Eichenberger et al. | |
| 2009/0113181 A1* | 4/2009 | Comparan | G06F 9/3851 712/215 |
| 2009/0276608 A1 | 11/2009 | Shimada | |
| 2010/0095087 A1 | 4/2010 | Eichenberger et al. | |
| 2010/0161942 A1 | 6/2010 | Bishop | |
| 2010/0262806 A1 | 10/2010 | Doing | |
| 2011/0153986 A1 | 6/2011 | Alexander et al. | |
| 2011/0302392 A1 | 12/2011 | Abernathy et al. | |
| 2012/0233441 A1 | 9/2012 | Barreh | |
| 2013/0205118 A1 | 8/2013 | Buyuktosunoglu et al. | |
| 2014/0351562 A1 | 11/2014 | Spadini | |
| 2015/0106595 A1* | 4/2015 | Khot | G06F 9/3836 712/215 |
| 2015/0220342 A1 | 8/2015 | Glossner | |
| 2016/0117172 A1 | 4/2016 | Alexander et al. | |
| 2016/0202988 A1 | 7/2016 | Ayub et al. | |
| 2017/0132010 A1 | 5/2017 | Vasekin et al. | |
| 2017/0235577 A1 | 8/2017 | Brownscheidle | |
| 2017/0344374 A1 | 11/2017 | Friedmann | |
| 2018/0232234 A1 | 8/2018 | Alexander | |

OTHER PUBLICATIONS

Anonymously; "VSU/FXU Powergating"; http://ip.com/IPCOM/000216899D; Apr. 23, 2012, 2 pages.
IBM; "Instruction Steering Policy for Balanced Utilization of a Biburcated Unified Issue Queue"; http://ip.com/IPCOM/000179961D; Mar. 3, 2009, 3 pages.
Joel A. Silberman, et al., Pending U.S. Appl. No. 15/826,734 entitled "Scalable Dependency Matrix With a Single Summary Bit in an Out-of-Order Processor," filed Nov. 30, 2017.
Joel A. Silberman, et al., Pending U.S. Appl. No. 15/826,742 entitled "Scalable Dependency Matrix With Wake-Up Columns for Long Latency Instructions in an Out-of-Order Processor," filed Nov. 30, 2017.
Joel A. Silberman, et al., Pending U.S. Appl. No. 15/826,746 entitled "Scalable Dependency Matrix With Multiple Summary Bits in an Out-of-Order Processor," filed Nov. 30, 2017
Joel A. Silberman, et al., Pending U.S. Appl. No. 15/826,754 entitled "Completing Coalesced Global Completion Table Entries in an Out-of-Order Processor," filed Nov. 30, 2017.
Joel A. Silberman, et al.., Pending U.S. Appl. No. 15/826,752 entitled "Coalescing Global Completion Table Entries in an Out-of-Order Processor," filed Nov. 30, 2017.
List of IBM Patents or Patent Applictions Treated as Related; (Appendix P), Filed Nov. 30, 2017.
Mericas, A.; "Performance Characteristics of the POWER8 Processor"; IBM Corporation, IBM Systems & Technology Group Development; 2014, 26 pages.
Mohit Karve, et al., Pending U.S. Appl. No. 15/826,738 entitled "Head and Tail Pointer Manipulation in a First-in-First-Out Issue Queue," filed Nov. 30, 2017.
Mohit S. Karve, et al., Pending U.S. Appl. No. 15/826,740 entitled "Block Based Allocation and Deallocation of Issue Queue Entries," filed Nov. 30, 2017.
U.S. Appl. No. 15/826,741, filed Nov. 30, 2017, Entitled: Buffered Instruction Dispatching to an Issue Queue, First Named Inventor: Mohit S. Karve.
Akkary et al., "Checkpoint processing and recovery: Towards scalable large instruction window processors." Microarchitecture, 2003. Micro-36. Proceedings. 36th Annual IEEE/ACM International Symposium on. IEEE, 2003, 12 pages.
Alastruey et al. "Selection of the Register File Size and the Resource Allocation Policy on SMT Processors." Computer Architecture and High Performance Computing, 2008. SBAC-PAD'08. 20th International Symposium on. IEEE, 2008, 8 pages.
Anonymously; "An extensible, scalable, optimized multithreaded data loading framework for software applications"; http://ip.com/IPCOM/000240374D; Jan. 28, 2015, 8 pages.
Anonymously; "Method and Apparatus for Hardware Assisted Function Shipping"; http://ip.com/IPCOM/000199436D; Sep. 3, 2010, 7 pages.
Daniele Folegnani et al., "Energy Effective Issue Logic" ISCA '01, Proceedings of the 28th annual international symposium on Computer architechture, pp. 230-239 (Year:2001).
Duong et al., "Compiler Assisted Out-of-Order Instruction Commit." Center for Embedded Computer Systems, University of California, Irvine (2010), 27 pages.
Ergin et al. "Increasing processor performance through early register release." Computer Design: VLSI in Computers and Processors, 2004. ICCD 2004. Proceedings. IEEE International Conference on. IEEE, 2004, 8 pages.
Herlihy et al., . Transactional memory: Architectural support for lock-free data structures. vol. 21. No. 2. ACM, 1993, 41 pages.
International Search Report and Written Opinion for International Application No. PCT/IB2018/058800; International Filing Date: Nov. 9, 2018; dated Feb. 27, 2019, 9 pages.
International Search Report and Written Opinion for International Application No. PCT/IB2018/058801, International Filing Date: Nov. 9, 2018; dated Jan. 21, 2019, 9 pages.
International Search Report/Written Opinion for International Application No. PCT/IB2018/058799, International Filing Date: Nov. 9, 2018; dated Feb. 12, 2019, 9 pages.
Koufaty et al., "Hyperthreading technology in the netburst microarchitecture." IEEE Micro 23.2 (2003): pp. 56-65.
Martinez et al. "Cherry: Checkpointed early resource recycling in out-of-order microprocessors." Microarchitecture, 2002.(Micro-35). Proceedings. 35th Annual IEEE/ACM International Symposium on. IEEE, 2002, 12 pages.
Ramíez et al., "Direct Instruction Wakeup for Out-of-Order Processors," Proc Innovative Architecture for Future Generation High-Performance Processors and Systems, IEEE, 2004, 8 Pages.
Shum et al., "IBM zEC12: The third-generation high-frequency mainframe microprocessor." Ieee Micro 33.2 (2013): pp. 38-47.

(56) References Cited

OTHER PUBLICATIONS

Subramaniam et al., "Store Vectors for Scalable Memory Dependence Prediction and Scheduling," Proc of the 12th Intl Symp on High-Performance Computer Architecture, IEEE, 2006, 12 pages.
Tendler, JM. et al.; "Power4 System microarchitecture"; IBM Corporation, IBM Research & Development; vol. 46, No. 1; Jan. 2002, 21 pages.
Joel A. Silberman, et al.., Pending U.S. Appl. No. 16/738,360 entitled "Coalescing Global Completion Table Entries in an Out-of-Order Processor," filed Jan. 3, 2020.
List of IBM Patents or Patent Applictions Treated as Related; (Appendix P), Filed Jan. 9, 2020.

* cited by examiner

US 10,884,753 B2

ISSUE QUEUE WITH DYNAMIC SHIFTING BETWEEN PORTS

BACKGROUND

Embodiments of the present invention relate in general to an out-of-order (OoO) processor and more specifically to an issue queue with dynamic shifting of instruction issue between ports.

In an OoO processor, an instruction sequencing unit (ISU) dispatches instructions to various issue queues, renames registers in support of OoO execution, issues instructions from the various issue queues to the execution pipelines, completes executed instructions, and handles exception conditions. Register renaming is typically performed by mapper logic in the ISU before the instructions are placed in their respective issue queues. The ISU includes one or more issue queues. Multiple instructions can be dispatched to the one or more issue queues per cycle. The one or more issue queues can be shared by one or more threads. Issue queues can include multiple ports to support parallel issuing of instructions to multiple units within the processor. Each additional port requires additional power and area, and the design may not scale well linearly as more ports are added, particularly if an odd number of ports is desired.

SUMMARY

Embodiments of the present invention include methods, systems, and computer program products for implementing dynamic shifting of instructions between ports of an issue queue. A non-limiting example of the computer-implemented method includes monitoring a number of instructions of a first type dispatched to a first shared port of an issue queue of a processor and determining whether the number of instructions of the first type dispatched to the first shared port exceeds a port selection threshold. An instruction of a third type is dispatched to a second shared port of the issue queue associated with a plurality of instructions of a second type based on determining that the number of instructions of the first type dispatched to the first shared port exceeds the port selection threshold. The instruction of the third type is dispatched to the first shared port of the issue queue associated with a plurality of instructions of the first type based on determining that the number of instructions of the first type dispatched to the first shared port does not exceed the port selection threshold.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
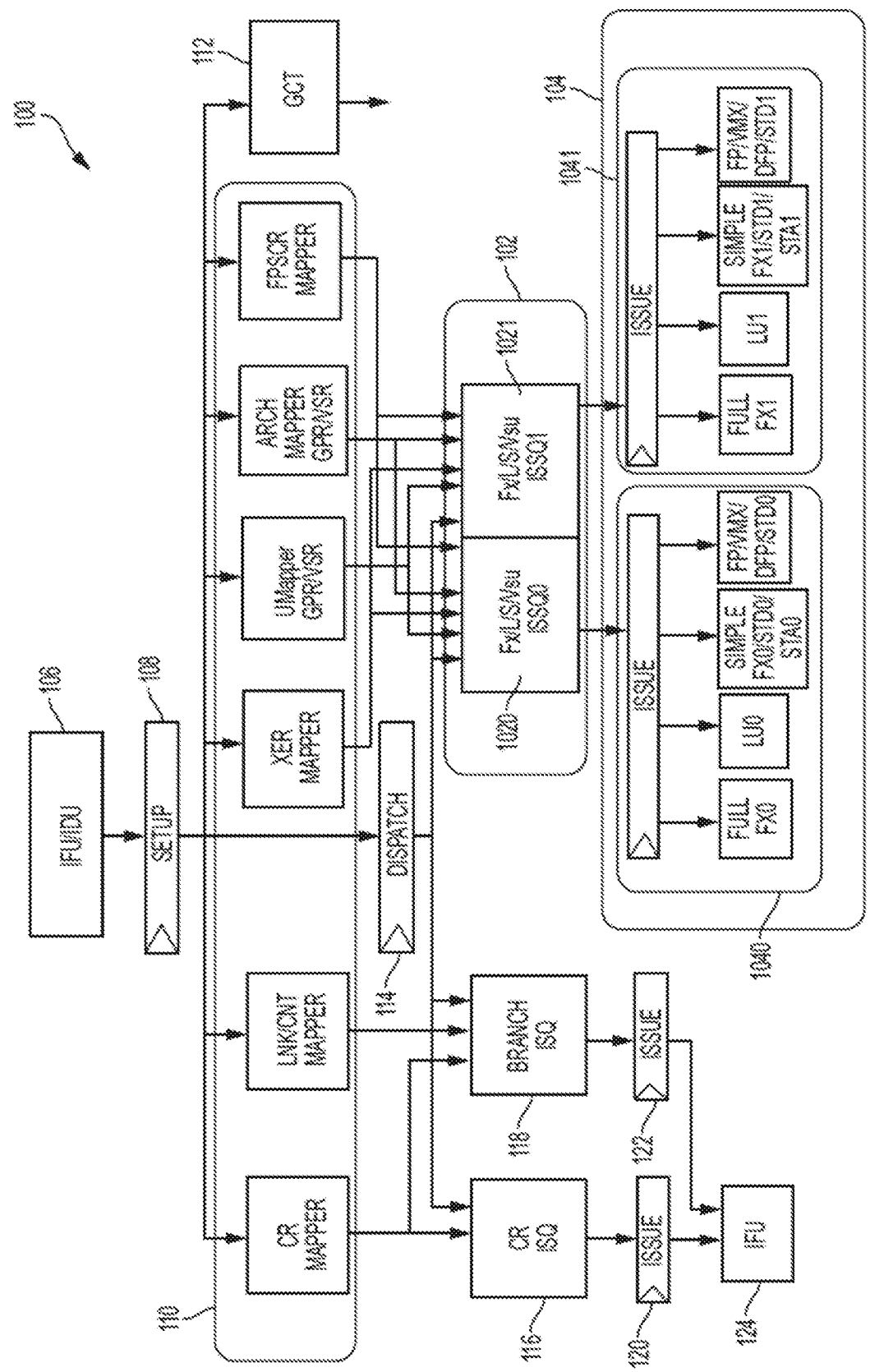
FIG. 1 depicts a block diagram of a system that includes an instruction sequencing unit (ISU) of an out-of-order (OoO) processor in accordance with one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

One or more embodiments of the present invention described herein provide dynamic shifting of instructions between ports of an issue queue. In embodiments, a partitioned issue queue refers to either multiple issue queue structures collectively or to a single issue queue that is partitioned using address mapping and support logic to perform as multiple separate issue queues. A partitioned issue queue can improve performance in multithreaded operations in an OoO processor, for instance, by limiting gaps due to dependencies of instructions from one or more threads issuing out of order. Dispatching multiple instructions per cycle also improves performance but can come a cost of greater physical area and power consumption due to an increased number of ports typically needed to support parallel instruction dispatching. The increased number of ports does not scale the design linearly, as additional support logic is typically needed to manage all of the port routing options. For instance, while using four ports per issue queue to dispatch four instruction types per cycle with two issue queue partitions may be manageable, when increasing to five instruction types, it may be impractical to include five ports per issue queue partition due to larger area and power requirements.

In embodiments of the present invention, one or more counters are used to monitor instruction type dispatching on one or more shared issue queue ports. As one example, dynamic port remapping can shift store data instructions between a vector-and-scalar unit (VSU) port and a fixed-point unit (FXU) port, as VSU operations typically occur less frequently and during high VSU operation activity there is typically less FXU activity. Similarly, dynamic port remapping can be performed between a floating-point unit (FPU) port and an FXU port for store data instructions, as FPU instructions may be less likely to dispatch in parallel with FXU instructions in some embodiments. The counters can reflect a total observed instruction type over a group of instructions, e.g., the last 128 instructions. Counts, fractions, or other numerical variations can be used to track and compare with a port selection threshold to switch instruction type assignments between ports. In some embodiments, the port selection threshold can be dynamically adjusted based on monitoring for conflicts between ports, such as where an instruction is forced to wait due to multiple instruction types attempting to use the same port at the same time.

Technical effects include re-assigning instruction types at shared ports that are more likely idle to accommodate an additional instruction type in parallel with other ports and reduce the number of unique ports needed per issue queue partition. Dynamic switching of instruction types for two or more ports can allow a greater number of instructions to issue in parallel than with static port assignments while also reducing area and power needs that would otherwise be required for additional static port assignments for additional instruction type support.

Turning now to FIG. 1, a block diagram of a system 100 that includes an instruction sequencing unit (ISU) of an out-of-order (OoO) processor for implementing dynamic shifting of instructions between ports of an issue queue is generally shown according to one or more embodiments of the present invention. The system 100 shown in FIG. 1 includes an instruction fetch unit/instruction decode unit (IFU/IDU) 106 that fetches and decodes instructions for input to a setup block 108 which prepares the decoded instructions for input to a mapper 110 of the ISU. In accordance with one or more embodiments of the present invention, six instructions at a time from a thread can be fetched and decoded by the IFU/IDU 106. In accordance with one or more embodiments of the present invention, the six instructions sent to the setup block 108 can include six non-branch instructions, five non-branch instructions and one branch instruction, or four non-branch instructions and two branch instructions. In accordance with one or more embodiments of the present invention, the setup block 108 checks that sufficient resources such as entries in the issue queues, completion table, mappers and register files exist before transmitting the fetched instructions to these blocks in the ISU.

The mappers 110 shown in FIG. 1 map programmer instructions (e.g., logical register names) to physical resources of the processor (e.g., physical register addresses). A variety of mappers 110 are shown in FIG. 1 including a condition register (CR) mapper; a link/count (LNK/CNT) register mapper; an integer exception register (XER) mapper; a unified mapper (UMapper) for mapping general purpose registers (GPRs) and vector-scalar registers (VSRs); an architected mapper (ARCH Mapper) for mapping GPRs and VSRs; and, a floating point status and control register (FPSCR) mapper.

The output from the setup block 108 is also input to a global completion table (GCT) 112 for tracking all of the instructions currently in the ISU. The output from the setup block 108 is also input to a dispatch unit 114 for dispatching the instructions to an issue queue. The embodiment of the ISU shown in FIG. 1 includes a CR issue queue, CR ISQ 116, which receives and tracks instructions from the CR mapper and issues 120 them to instruction fetch unit (IFU) 124 to execute CR logical instructions and movement instructions. Also shown in FIG. 1 is a branch issue queue, Branch ISQ 118, which receives and tracks branch instructions and LNK/CNT physical addresses from the LNK/CNT mapper. Branch ISQ 118 can issue 122 an instruction to IFU 124 to redirect instruction fetching if a predicted branch address and/or direction was incorrect.

Instructions output from the dispatch logic and renamed registers from the LNK/CNT mapper, XER mapper, UMapper (GPR/VSR), ARCH Mapper (GPR/VSR), and FPSCR mapper are input to issue queue 102. As shown in FIG. 1, issue queue 102 tracks dispatched fixed point instructions (Fx), load instructions (L), store instructions (S), and vector-and-scaler unit (VSU) instructions. As shown in the embodiment of FIG. 1, issue queue 102 is broken up into two parts, ISQ0 1020 and ISQ1 1021, each portion holding N/2 instructions. When the processor is executing in ST mode, the issue queue 102 can be used as a single logical issue queue that contains both ISQ0 1020 and ISQ1 1021 to process all of the instructions (in this example all N instructions) of a single thread.

When the processor is executing in SMT mode, ISQ0 1020 can be used to process N/2 instructions from a first thread and ISQ1 1021 is used to process N/2 instructions from a second thread ISQ1 1021.

As shown in FIG. 1, issue queue 102 issues instructions to execution units 104 which are split into two groups of execution units 1040 1041. Both groups of execution units 1040 1041 shown in FIG. 1 include a full fixed point execution unit (Full FX0, Full FX1); a load execution unit (LU0, LU1); a simple fixed point, store data, and store address execution unit (Simple FX0/STD0/STA0, Simple FX1/STD1/STA1); and a floating point, vector multimedia extension, decimal floating point, and store data execution unit (FP/VMX/DFP/STD0, FP/VMX/DFP/STD1). As shown in FIG. 1, when the processor is executing in ST mode, the first group of execution units 1040 execute instructions issued from ISQ0 1020 and the second group of execution units 1041 execute instructions issued from ISQ1 1021. In alternate embodiments of the present invention when the processor is executing in ST mode, instructions issued from both ISQ0 1020 and ISQ1 1021 in issue queue 102 can be issued to execution units in any of the execution units 1040 in the first group of execution units 1040 and the second group of execution units 1041.

In accordance with one or more embodiments of the present invention, when the processor is executing in SMT mode, the first group of execution units 1040 execute instructions of the first thread issued from ISQ0 1020 and the second group of execution units 1041 execute instructions of the second thread issued from ISQ1 1021.

The number of entries in the issue queue 102 and sizes of other elements (e.g., bus widths, queue sizes) shown in FIG. 1 are intended to be exemplary in nature as embodiments of the present invention can be implemented for issue queues and other elements of a variety of different sizes. In accordance with one or more embodiments of the present invention, the sizes are selectable, or programmable.

Figure 2:
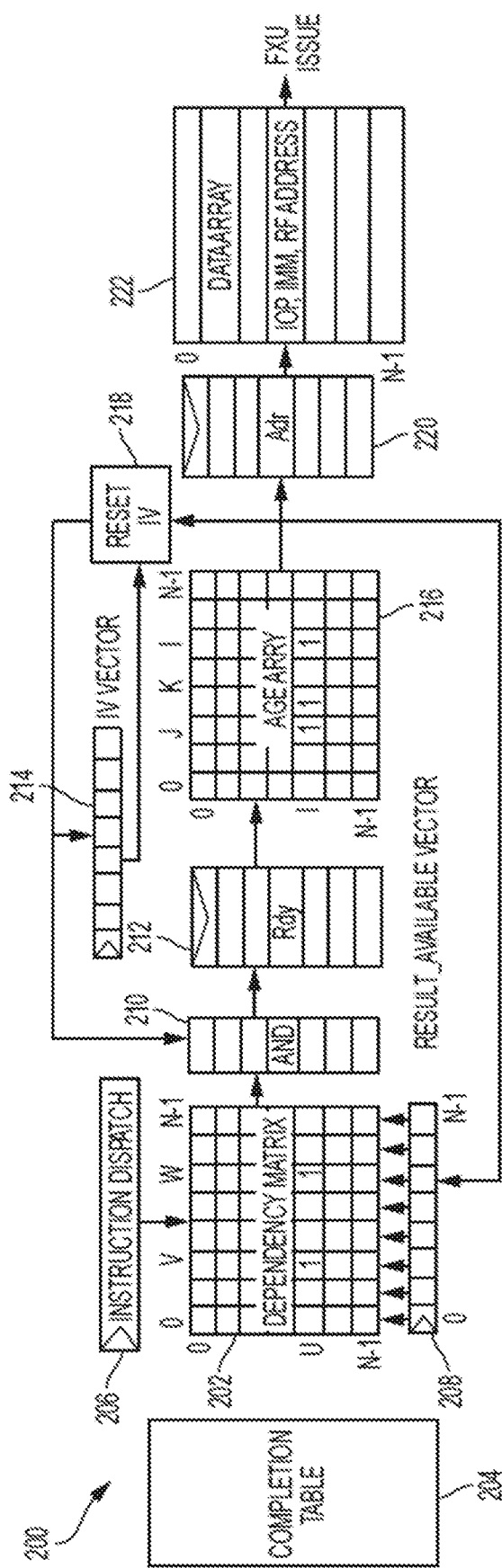
FIG. 2 depicts a block diagram of an issue queue in an ISU of an OoO processor in accordance with one or more embodiments of the present invention.

Turning now to FIG. 2, a block diagram of an issue queue 200 is generally shown according to one or more embodiments of the present invention. The issue queue 200 shown in FIG. 2 includes matrices, tables, and vectors for tracking instructions that are waiting to be issued. The matrices and tables each include a corresponding row for each instruction being tracked, and the vectors include an entry for instructions being tracked. As the number of instructions in the issue queues continues to increase, the amount of space and power taken up by each of the matrices, tables, and vectors is growing.

The issue queue 200 tracks instructions that are waiting for execution by an execution unit. An instruction is dispatched and allocated to the issue queue 200 (e.g., CR ISQ 116, Branch ISQ 118, issue queue 102). The instruction is ready to issue from the issue queue 200 when its dependencies are satisfied, that is when the instructions have issued and their corresponding results are available. The issue queue 200 issues the instruction to an execution unit (e.g., execution unit 104). After issuing the instruction, the issue queue 200 continues to track the instruction at least until the instruction passes a rejection point. The rejection point is different for different instructions and refers to the point where it is known that the instruction will not have to be reissued (e.g., in a read memory operation the rejection point can be passed once the cache is accessed for the read data). Once the instruction has passed the rejection point it can be deallocated from the issue queue and the entry in the issue queue is cleared for reuse by a new instruction. The instruction finishes once the execution of the instruction, by an execution unit, has completed.

The issue queue 200 shown in FIG. 2 includes: a dependency matrix 202 for tracking dependencies between instructions in the issue queue 200; a completion table 204 for indicating that the execution of an instruction has passed the rejection point and the instruction can be deallocated from the issue queue 200; an instruction dispatch unit 206 (e.g., dispatch unit 114 in FIG. 1) for receiving instructions to add to the issue queue; a result-available vector 208 for indicating that all of the instructions that the instruction is dependent on have issued; an IV vector 210 that indicates the instructions that are valid and issuable; AND logic 210 that logically ANDs the output of the dependency matrix with the IV vector; a ready vector 212 for indicting that the results from all of the instructions that the instruction is dependent on are available and the instruction is valid and issuable; an age array 216 for tracking the order that the instructions came into the issue queue so that when two or more instructions are ready for execution, older instruction can be selected before newer instruction; a reset IV control 218 for updating the IV state to prevent re-issue of a selected instruction or permit re-issue after rejection; an address 220 used as a read index corresponding to the instruction selected for issue; and a data array 222 containing the text of the instruction that is used by the execution unit for executing the instruction (e.g., an opcode, a pointer to a register file address, immediate data).

As shown in the dependency matrix 202 of FIG. 2 which can track N instructions that are waiting in the issue queue, an instruction at position "u" depends on the instructions at position "v" and "w". The dependency matrix 202 shown in FIG. 2 has N rows and N columns, one row and column for each instruction in the issue queue. As shown in the age array 216 of FIG. 2, instructions at positions "j", "k", and "l" are older than the instruction at position "i".

Figure 3:
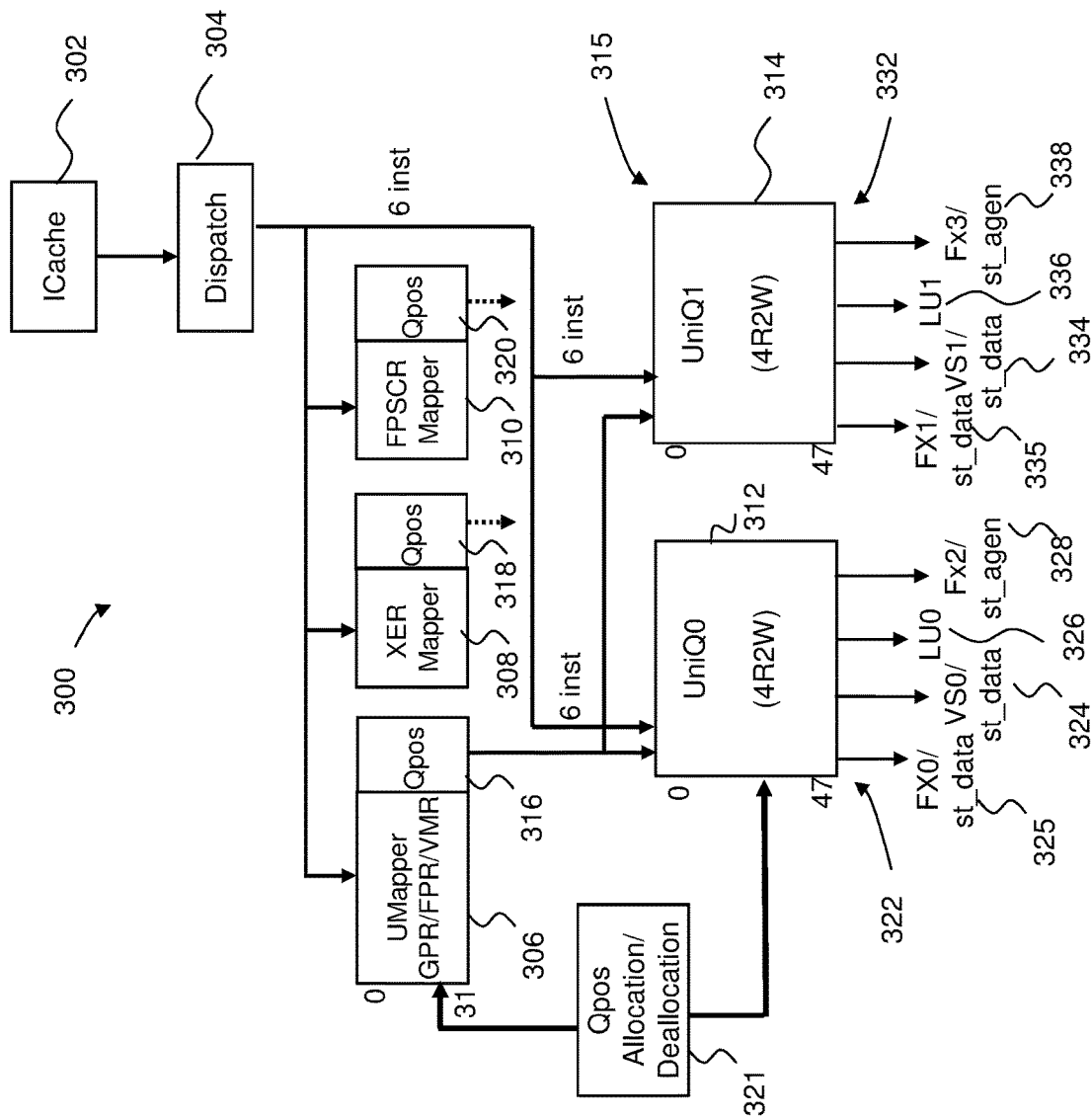
FIG. 3 depicts a block diagram of a system for dynamic shifting between ports of an issue queue in accordance with one or more embodiments of the present invention.

FIG. 3 depicts a block diagram of a system 300 for dynamic shifting of instructions between ports of an issue queue in accordance with one or more embodiments of the present invention. Instructions from an instruction cache 302 can be fetched and provided to a dispatch unit 304, which can dispatch multiple instructions in parallel (e.g., up to six instructions in parallel) to a unified mapper 306, an integer exception register mapper 308, a floating point status and control register mapper 310, a first issue queue partition 312, and/or a second issue queue partition 314. The first issue queue partition 312 and the second issue queue partition 314 are partitions of issue queue 315 that can be separately managed or managed together. The issue queue 315 is an embodiment of the issue queue 102 of FIG. 1. The dispatch unit 304 is an embodiment of dispatch unit 114 of FIG. 1 operable to dispatch instructions in parallel. The mappers 306-310 are embodiments of the mappers 110 of FIG. 1. Each of the mappers 306, 308, 310 can include corresponding instances of queue position logic 316, 318, 320 to track positions of entries within the first issue queue partition 312 and/or the second issue queue partition 314. Queue position allocation/deallocation logic 321 can enable allocation and/or deallocation of entries in the first issue queue partition 312 and/or the second issue queue partition 314 by the mappers 306-310.

In the example of FIG. 3, the first issue queue partition 312 includes four ports 322 to issue entries to various units, such as the first group of execution units 1040 of FIG. 1. Similarly, the second issue queue partition 314 includes four ports 332 to issue entries to various units, such as the second group of execution units 1041 of FIG. 1. In embodiments, a plurality of the ports 322, 332 are configured as shared ports operable to provide instructions to two or more units. In the example of FIG. 3, the ports 322 include a first shared port 324, a second shared port 325, a third port 326, and a fourth port 328. The first shared port 324 is operable to issue instructions for a vector-and-scalar unit (VS0) or store data instructions. The second shared port 325 is operable to issue instructions for a fixed-point unit (FX0) or store data instructions. The third port 326 is operable to issue instructions for a load unit (LU0). The fourth port 328 is operable to issue instructions for a fixed-point unit (FX2) or store address generation (AGEN) instructions. The first shared port 324 and the second shared port 325 of ports 322 support dynamic instruction shifting of store data instructions between either shared port 324, 325 depending on the level of activity of each shared port 324, 325. The first shared port 324 is primarily for vector-and-scalar unit instructions as a first type of instructions, and the second shared port 325 is primarily for fixed-point instructions as a second type of instructions, where the store data instructions are a third type of instructions that can issue through either the first shared port 324 or the second shared port 325.

Similar to ports 322, the ports 332 include a first shared port 334, a second shared port 335, a third port 336, and a fourth port 338. The first shared port 334 is operable to issue instructions for a vector-and-scalar unit (VS1) or store data instructions. The second shared port 335 is operable to issue instructions for a fixed-point unit (FX1) or store data instructions. The third port 336 is operable to issue instructions for a load unit (LU1). The fourth port 338 is operable to issue instructions for a fixed-point unit (FX3) or store address generation (AGEN) instructions. The first shared port 334 and the second shared port 335 of ports 332 support dynamic instruction shifting of store data instructions between either shared port 334, 335 depending on the level of activity of each shared port 334, 335. The first shared port 334 is primarily for vector-and-scalar unit instructions as a first type of instructions, and the second shared port 335 is primarily for fixed-point instructions as a second type of instructions, where the store data instructions are a third type of instructions that can issue through either the first shared port 334 or the second shared port 335.

In alternate embodiments, different numbers of ports 322, 332 and port assignments can be implemented, including at least two shared ports. For example, the first shared port 324, 334 can be primarily assigned to a floating-point unit as the first type of instructions. To avoid expanding the first issue queue partition 312 and the second issue queue partition 314 to include a one-to-one port to unit assignment, the first, second, and third instruction types assigned to the first and second shared ports 324, 334, 325, 335 are selected to reduce a risk of conflicts. For example, blocks of code that include a large number of vector operations may have fewer fixed-point operations, and thus reduce the risk of conflict by dispatching store data instructions to the second shared port 325, 335 while multiple vector instructions are being dispatched to the first shared port 324, 334. Similarly, in blocks of code with a sufficiently low number of vector instructions being dispatched, a lower risk of conflicts can be observed by dispatching store data instructions to the first shared port 324, 334. One or more thresholds can be applied as the selection criteria between the first shared port 324, 334 and the second shared port 325, 335 relative to one or more instruction type counters as further described in reference to FIG. 4.

Figure 4:
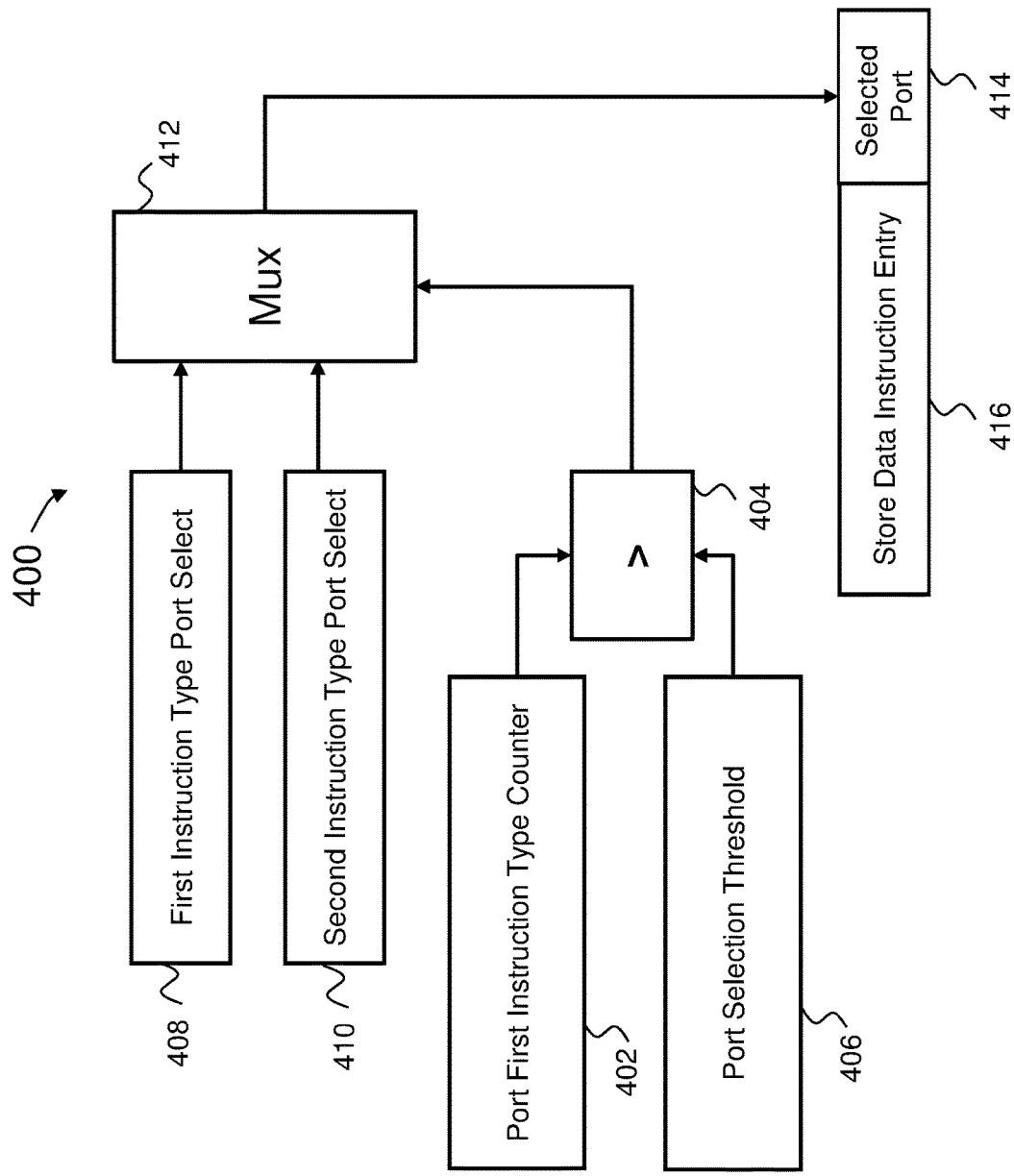
FIG. 4 depicts a block diagram of port selection for instruction shifting between ports of an issue queue in accordance with one or more embodiments of the present invention.

FIG. 4 depicts a block diagram of a system 400 for port selection for instruction shifting between ports of an issue queue in accordance with one or more embodiments of the present invention. The dispatch unit 304 of FIG. 3 may include a separate instance of the system 400 for each of the first issue queue partition 312 and the second issue queue partition 314 of FIG. 3. Alternatively, elements of the system 400 can be shared for the first issue queue partition 312 and the second issue queue partition 314. In the example of FIG. 4, a value of a port first instruction type counter 402 is compared at block 404 to a port selection threshold 406 to select between a first instruction type port select 408 and a second instruction type port select 410 at a multiplexer 412 as a selected port 414 for a store data instruction entry 416. For example, the port first instruction type counter 402 can track a number of instructions of the first type (e.g., vector instructions or floating-point instructions) dispatched over the most recent N instructions to determine if the number of instructions of the first type dispatched to the first shared port 324, 334 of FIG. 3 exceeds the port selection threshold 406. If the number of instructions of the first type dispatched to the first shared port 324, 334 exceeds the port selection threshold 406, then the second instruction type port select 410 is selected by the multiplexer 412 to mark the selected port 414 of the store data instruction entry 416 for dispatching to the second shared port 325, 335. Otherwise, in the example of FIG. 4, if the number of instructions of the first type dispatched to the first shared port 324, 334 does not exceed the port selection threshold 406, then the first instruction type port select 408 is selected by the multiplexer 412 to mark the selected port 414 of the store data instruction entry 416 for dispatching to the first shared port 324, 334.

Figure 5:
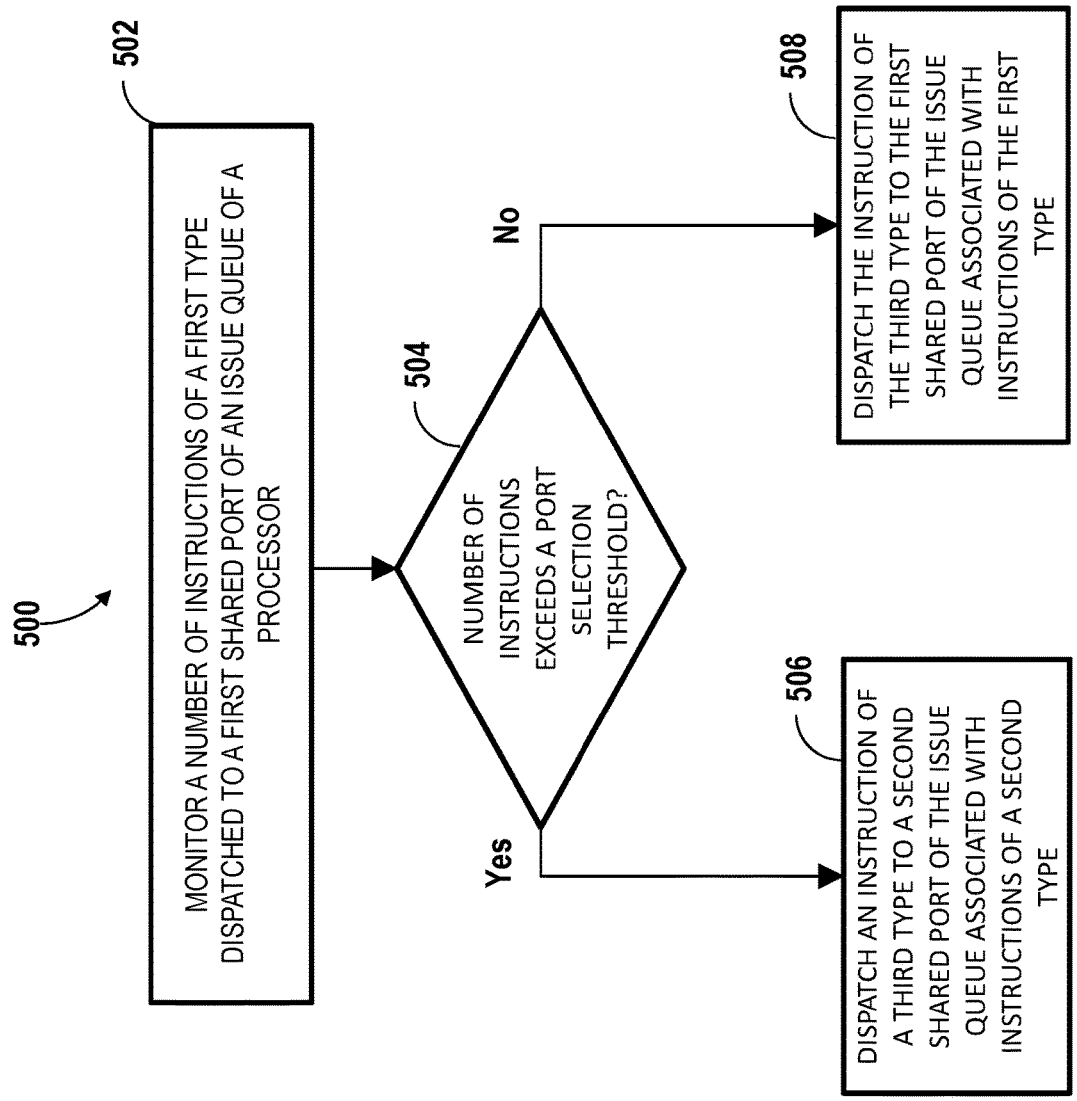
FIG. 5 depicts a process for dynamic shifting of instructions between ports of an issue queue in accordance with one or more embodiments of the present invention.

Turning now to FIG. 5, a flow diagram of a process 500 for dynamic shifting of instructions between ports of an issue queue is generally shown in accordance with an embodiment of the present invention. The process 500 is described with reference to FIGS. 1-4 and may include additional steps beyond those depicted in FIG. 5. The process 500 can be performed by a dispatch unit, such as dispatch unit 304 of FIG. 3, within an OoO processor of system 100 of FIG. 1. The example described herein is in reference to one or two issue queue partitions and can be extended to any number of issue queue partitions. For purposes of explanation, process 500 is described with respect to the systems 300 and 400 of FIGS. 3 and 4.

At block 502, the dispatch unit 304 monitors a number of instructions of a first type dispatched to a first shared port 324, 334 of an issue queue 315 of a processor. At block 504, the dispatch unit 304 determines whether the number of instructions of the first type dispatched to the first shared port 324, 334 exceeds a port selection threshold 406, for instance, as tracked by one or more instance of the port first instruction type counter 402.

At block 506, the dispatch unit 304 dispatches an instruction of a third type to a second shared port 325, 335 of the issue queue 315 associated with a plurality of instructions of a second type based on determining that the number of instructions of the first type dispatched to the first shared port 324, 334 exceeds the port selection threshold 406. As one example, the instructions of the first type can be vector-and-scalar unit instructions, the instructions of the second type can be fixed-point instructions, and the instruction of the third type can be a store data instruction. As another example, the instructions of the first type can be floating-point instructions, the instructions of the second type can be fixed-point instructions, and the instruction of the third type can be a store data instruction.

At block 508, the dispatch unit 304 dispatches the instruction of the third type to the first shared port 324, 334 of the issue queue 315 associated with a plurality of instructions of the first type based on determining that the number of instructions of the first type dispatched to the first shared port 324, 334 does not exceed the port selection threshold 406.

As previously noted, the issue queue 315 can include a first issue queue partition 312 including a first instance of the first shared port 324, a first instance of the second shared port 325, a first instance of a third port 326, and a first instance of a fourth port 328. The issue queue 315 can also include a second issue queue partition 314 including a second instance of the first shared port 334, a second instance of the second shared port 335, a second instance of the third port 336, and a second instance of the fourth port 338. The number of instructions of the first type dispatched to the first shared port 324, 334 can be separately tracked for each of the first issue queue partition 312 and the second issue queue partition 314. In some embodiments, the port selection threshold 406 is programmable, for instance, as further described in reference to FIG. 6.

Figure 6:
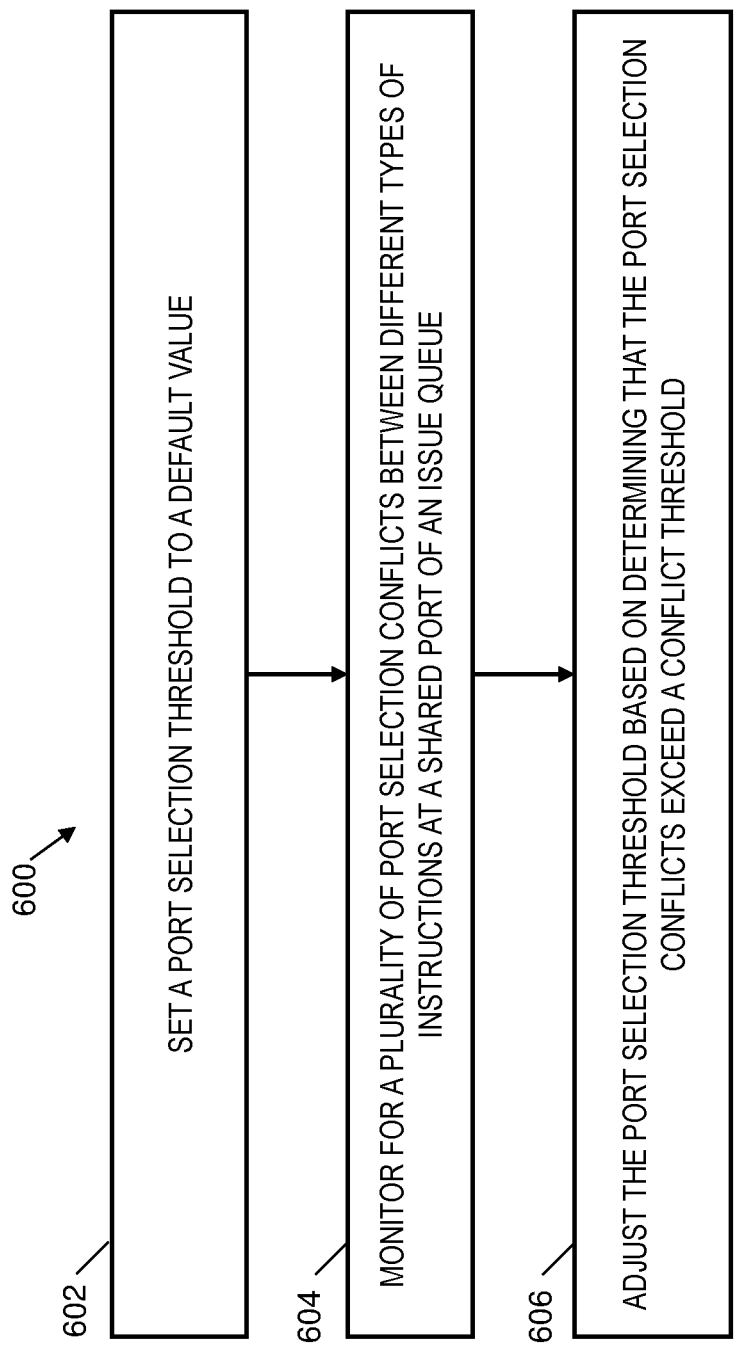
FIG. 6 depicts a process for port selection threshold adjustment in accordance with one or more embodiments of the present invention.

Turning now to FIG. 6, a flow diagram of a process 600 for port selection threshold adjustment is generally shown in accordance with an embodiment of the present invention. The process 600 is described with reference to FIGS. 1-5 and may include additional steps beyond those depicted in FIG. 6. The process 600 can be performed by a dispatch unit within an OoO processor as embodiments of system 100 of FIG. 1.

At block 602, the port selection threshold 406 is set to a default value. For example, the port selection threshold 406 can be initially set to a value equivalent to about 25% of the number of instructions analyzed per block of instructions. Thus, if a block of 128 instructions are analyzed before being compared at block 404 to the port selection threshold 406, then the port selection threshold 406 can be set to a value of 32 instructions as the default value.

At block 604, the dispatch unit 304 or another element can monitor for a plurality of port selection conflicts between different types of instructions at a shared port of the issue queue 315. For instance, conflicts can be counted between dispatches of store data instructions and vector instructions at the same time for the first shared port 324, 334, and/or conflicts can be counted between dispatches of store data instructions and fixed-point instructions at the same time for the second shared port 325, 335.

At block 606, the port selection threshold 406 can be adjusted based on determining that the port selection conflicts exceed a conflict threshold. For instance, if conflict checking is performed with respect to the first shared port 324, 334, and if the number of conflicts per period of time exceeds the conflict threshold, then the port selection threshold 406 may be increased. If the conflict checking is performed with respect to the second shared port 325, 335, and if the number of conflicts per period of time exceeds the conflict threshold, then the port selection threshold 406 may be decreased.

Figure 7:
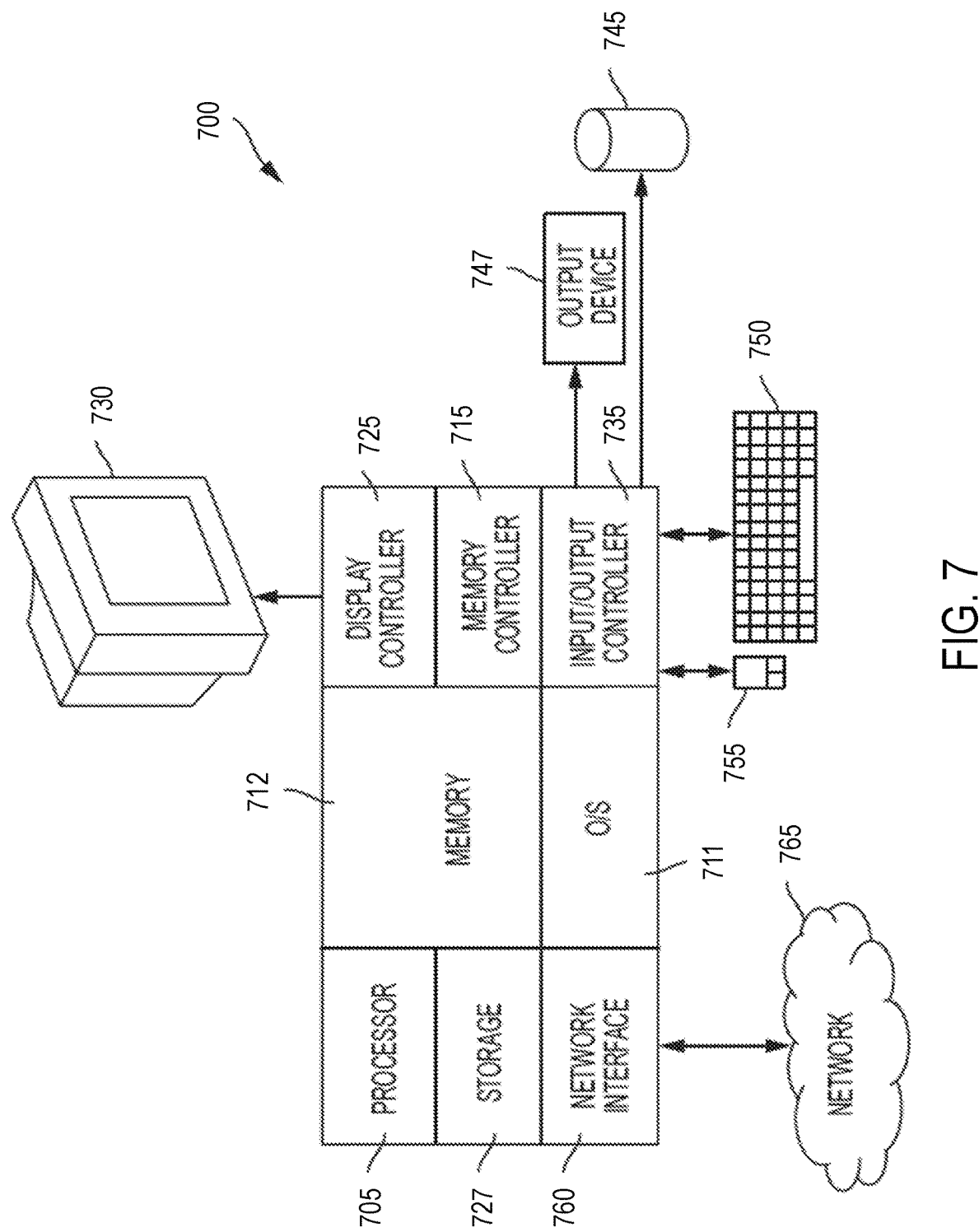
FIG. 7 depicts a block diagram of a computer system for implementing some or all aspects of dynamic shifting of instructions between ports of an issue queue in accordance with one or more embodiments of the present invention.

Turning now to FIG. 7, a block diagram of a computer system 700 for implementing some or all aspects of dynamic shifting of instruction types between ports of an issue queue of an OoO processor is generally shown according to one or more embodiments of the present invention. The processing described herein may be implemented in hardware, software (e.g., firmware), or a combination thereof. In an exemplary embodiment, the methods described may be implemented, at least in part, in hardware and may be part of the microprocessor of a special or general-purpose computer system 700, such as a mobile device, personal computer, workstation, minicomputer, or mainframe computer.

In an exemplary embodiment, as shown in FIG. 7, the computer system 700 includes a processor 705, memory 712 coupled to a memory controller 715, and one or more input devices 745 and/or output devices 747, such as peripherals, that are communicatively coupled via a local I/O controller 735. These devices 745 and 747 may include, for example, a printer, a scanner, a microphone, and the like. A conventional keyboard 750 and mouse 755 may be coupled to the I/O controller 735. The I/O controller 735 may be, for example, one or more buses or other wired or wireless connections, as are known in the art. The I/O controller 735 may have additional elements, which are omitted for simplicity, such as controllers, buffers (caches), drivers, repeaters, and receivers, to enable communications.

The I/O devices 745, 747 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 705 is a hardware device for executing hardware instructions or software, particularly those stored in memory 712. The processor 705 may be a custom made or commercially available processor, a central processing unit (CPU), an auxiliary processor among several processors associated with the computer system 700, a semiconductor based microprocessor (in the form of a microchip or chip set), a macroprocessor, or other device for executing instructions. The processor 705 can include a cache such as, but not limited to, an instruction cache to speed up executable instruction fetch, a data cache to speed up data fetch and store, and a translation look-aside buffer (TLB) used to speed up virtual-to-physical address translation for both executable instructions and data. The cache may be organized as a hierarchy of more cache levels (L1, L2, etc.).

The memory 712 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 712 may incorporate electronic, magnetic, optical, or other types of storage media. Note that the memory 712 may have a distributed architecture, where various components are situated remote from one another but may be accessed by the processor 705.

The instructions in memory 712 may include one or more separate programs, each of which comprises an ordered listing of executable instructions for implementing logical functions. In the example of FIG. 7, the instructions in the memory 712 include a suitable operating system (OS) 711. The operating system 711 essentially may control the execution of other computer programs and provides scheduling, input-output control, file and data management, memory management, and communication control and related services.

Additional data, including, for example, instructions for the processor 705 or other retrievable information, may be stored in storage 727, which may be a storage device such as a hard disk drive or solid state drive. The stored instructions in memory 712 or in storage 727 may include those enabling the processor to execute one or more aspects of the dispatch systems and methods of this disclosure.

The computer system 700 may further include a display controller 725 coupled to a display 730. In an exemplary embodiment, the computer system 700 may further include a network interface 760 for coupling to a network 765. The network 765 may be an IP-based network for communication between the computer system 700 and an external server, client and the like via a broadband connection. The network 765 transmits and receives data between the computer system 700 and external systems. In an exemplary embodiment, the network 765 may be a managed IP network administered by a service provider. The network 765 may be implemented in a wireless fashion, e.g., using wireless protocols and technologies, such as WiFi, WiMax, etc. The network 765 may also be a packet-switched network such as a local area network, wide area network, metropolitan area network, the Internet, or other similar type of network environment. The network 765 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods for dynamic shifting of instruction types between ports of an issue queue as described herein can be embodied, in whole or in part, in computer program products or in computer systems 700, such as that illustrated in FIG. 7.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    monitoring a number of instructions of a first type dispatched to a first shared port of an issue queue of a processor using a port first instruction type counter, wherein the issue queue comprises at least two shared ports to dispatch at least three types of instructions;
    determining whether the number of instructions of the first type dispatched to the first shared port exceeds a port selection threshold by comparing a value of the port first instruction type counter to the port selection threshold based on a most recent number of dispatched instructions over a predetermined number of instructions;
    dispatching an instruction of a third type to a second shared port of the issue queue associated with a plurality of instructions of a second type based on determining that the number of instructions of the first type dispatched to the first shared port exceeds the port selection threshold, wherein the value of the port first instruction type counter is greater than the port selection threshold;
    dispatching the instruction of the third type to the first shared port of the issue queue associated with a plurality of instructions of the first type based on determining that the number of instructions of the first type dispatched to the first shared port does not exceed the port selection threshold, wherein the value of the port first instruction type counter is less than the port selection threshold;
    monitoring for a plurality of port selection conflicts between different types of instructions at the first shared port and the second shared port of the issue queue; and
    adjusting the port selection threshold based on determining that the port selection conflicts exceed a conflict threshold to switch instruction type assignments between the first shared port and the second shared port, wherein adjusting the port selection threshold comprises increasing the port selection threshold based on the number of conflicts at the first shared port per period of time that exceeds the conflict threshold, and decreasing the port selection threshold based on the number of conflicts at the second shared port per period of time that exceeds the conflict threshold.

2. The computer-implemented method of claim 1, wherein the instructions of the first type comprise vector-and-scalar unit instructions, the instructions of the second type comprise fixed-point instructions, and the instruction of the third type comprises a store data instruction.

3. The computer-implemented method of claim 1, wherein the instructions of the first type comprise floating-point instructions, the instructions of the second type comprise fixed-point instructions, and the instruction of the third type comprises a store data instruction.

4. The computer-implemented method of claim 1, wherein the issue queue comprises a first issue queue partition including a first instance of the first shared port, a first instance of the second shared port, a first instance of a third port, and a first instance of a fourth port, and the issue queue further comprises a second issue queue partition including a second instance of the first shared port, a second instance of the second shared port, a second instance of the third port, and a second instance of the fourth port.

5. The computer-implemented method of claim 4, wherein the number of instructions of the first type dispatched to the first shared port is separately tracked for each of the first issue queue partition and the second issue queue partition.

6. The computer-implemented method of claim 1, wherein monitoring for the port selection conflicts between different types of instructions at the first shared port and the second shared port of the issue queue comprises counting the port selection conflicts between a store data instruction and a vector instruction dispatched for the first shared port, and counting the port selection conflicts between the store data instruction and a fixed-point instruction dispatched for the second shared port.

7. A system comprising:
    an issue queue of a processor, the issue queue comprising a first shared port associated with a plurality of instructions of a first type and a second shared port associated with a plurality of instructions of a second type, and the first and second shared ports are configurable to dispatch at least three types of instructions; and
    a dispatch unit of the processor operable to perform a plurality of operations comprising:
        monitoring a number of instructions of the first type dispatched to the first shared port of the issue queue using a port first instruction type counter;
        determining whether the number of instructions of the first type dispatched to the first shared port exceeds a port selection threshold by comparing a value of the port first instruction type counter to the port selection threshold based on a most recent number of dispatched instructions over a predetermined number of instructions;

dispatching an instruction of a third type to the second shared port of the issue queue based on determining that the number of instructions of the first type dispatched to the first shared port exceeds the port selection threshold, wherein the value of the port first instruction type counter is greater than the port selection threshold;

dispatching the instruction of the third type to the first shared port of the issue queue based on determining that the number of instructions of the first type dispatched to the first shared port does not exceed the port selection threshold, wherein the value of the port first instruction type counter is less than the port selection threshold;

monitoring for a plurality of port selection conflicts between different types of instructions at the first shared port and the second shared port of the issue queue; and adjusting the port selection threshold based on determining that the port selection conflicts exceed a conflict threshold to switch instruction type assignments between the first shared port and the second shared port, wherein adjusting the port selection threshold comprises increasing the port selection threshold based on the number of conflicts at the first shared port per period of time that exceeds the conflict threshold, and decreasing the port selection threshold based on the number of conflicts at the second shared port per period of time that exceeds the conflict threshold.

8. The system of claim 7, wherein the instructions of the first type comprise vector-and-scalar unit instructions, the instructions of the second type comprise fixed-point instructions, and the instruction of the third type comprises a store data instruction.

9. The system of claim 7, wherein the instructions of the first type comprise floating-point instructions, the instructions of the second type comprise fixed-point instructions, and the instruction of the third type comprises a store data instruction.

10. The system of claim 7, wherein the issue queue comprises a first issue queue partition including a first instance of the first shared port, a first instance of the second shared port, a first instance of a third port, and a first instance of a fourth port, and the issue queue further comprises a second issue queue partition including a second instance of the first shared port, a second instance of the second shared port, a second instance of the third port, and a second instance of the fourth port.

11. The system of claim 10, wherein the number of instructions of the first type dispatched to the first shared port is separately tracked for each of the first issue queue partition and the second issue queue partition.

12. The system of claim 7, wherein monitoring for the port selection conflicts between different types of instructions at the first shared port and the second shared port of the issue queue comprises counting the port selection conflicts between a store data instruction and a vector instruction dispatched for the first shared port, and counting the port selection conflicts between the store data instruction and a fixed-point instruction dispatched for the second shared port.

13. A computer program product comprising a computer readable storage medium having program instructions embodied therewith, the program instructions executable by a processor to cause the processor to perform operations comprising:

monitoring a number of instructions of a first type dispatched to a first shared port of an issue queue using a port first instruction type counter, wherein the issue queue comprises at least two shared ports to dispatch at least three types of instructions;

determining whether the number of instructions of the first type dispatched to the first shared port exceeds a port selection threshold by comparing a value of the port first instruction type counter to the port selection threshold based on a most recent number of dispatched instructions over a predetermined number of instructions;

dispatching an instruction of a third type to a second shared port of the issue queue associated with a plurality of instructions of a second type based on determining that the number of instructions of the first type dispatched to the first shared port exceeds the port selection threshold, wherein the value of the port first instruction type counter is greater than the port selection threshold;

dispatching the instruction of the third type to the first shared port of the issue queue associated with a plurality of instructions of the first type based on determining that the number of instructions of the first type dispatched to the first shared port does not exceed the port selection threshold, wherein the value of the port first instruction type counter is less than the port selection threshold;

monitoring for a plurality of port selection conflicts between different types of instructions at the first shared port and the second shared port of the issue queue; and adjusting the port selection threshold based on determining that the port selection conflicts exceed a conflict threshold to switch instruction type assignments between the first shared port and the second shared port, wherein adjusting the port selection threshold comprises increasing the port selection threshold based on the number of conflicts at the first shared port per period of time that exceeds the conflict threshold, and decreasing the port selection threshold based on the number of conflicts at the second shared port per period of time that exceeds the conflict threshold.

14. The computer program product of claim 13, wherein the instructions of the first type comprise vector-and-scalar unit instructions, the instructions of the second type comprise fixed-point instructions, and the instruction of the third type comprises a store data instruction.

15. The computer program product of claim 13, wherein the instructions of the first type comprise floating-point instructions, the instructions of the second type comprise fixed-point instructions, and the instruction of the third type comprises a store data instruction.

16. The computer program product of claim 13, wherein the issue queue comprises a first issue queue partition including a first instance of the first shared port, a first instance of the second shared port, a first instance of a third port, and a first instance of a fourth port, and the issue queue further comprises a second issue queue partition including a second instance of the first shared port, a second instance of the second shared port, a second instance of the third port, and a second instance of the fourth port.

17. The computer program product of claim 16, wherein the number of instructions of the first type dispatched to the first shared port is separately tracked for each of the first issue queue partition and the second issue queue partition.

18. The computer program product of claim 13, wherein monitoring for the port selection conflicts between different types of instructions at the first shared port and the second shared port of the issue queue comprises counting the port selection conflicts between a store data instruction and a vector instruction dispatched for the first shared port, and counting the port selection conflicts between the store data instruction and a fixed-point instruction dispatched for the second shared port.

* * * * *